United States Patent
Wen

(10) Patent No.: US 10,098,038 B2
(45) Date of Patent: Oct. 9, 2018

(54) WIRELESS MODULE AND METHOD OF REDUCING INTERFERENCE BETWEEN MULTIPLE WIRELESS ANTENNAS

(71) Applicant: MediaTek Inc., Hsin-Chu (TW)

(72) Inventor: Yu-Ming Wen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 184 days.

(21) Appl. No.: 15/168,474

(22) Filed: May 31, 2016

(65) Prior Publication Data
US 2017/0347293 A1 Nov. 30, 2017

(51) Int. Cl.
*H04W 72/04* (2009.01)
*H04W 28/08* (2009.01)
*H04W 56/00* (2009.01)
*H04W 4/80* (2018.01)

(52) U.S. Cl.
CPC ........... *H04W 28/085* (2013.01); *H04W 4/80* (2018.02); *H04W 56/001* (2013.01); *H04W 72/0446* (2013.01)

(58) Field of Classification Search
CPC . H04W 88/06; H04W 72/1215; H04W 16/14; H04W 24/04; H04W 72/0446; H04W 24/10; H04W 36/0005; H04W 36/20; H04W 4/005; H04L 1/0025; H04L 1/0026; H04L 1/0041; H04L 1/0045; H04L 5/001; H04L 5/006; H04L 5/14
See application file for complete search history.

(56) References Cited

U.S. PATENT DOCUMENTS

| | | | | |
|---|---|---|---|---|
| 8,750,926 B2* | 6/2014 | Fu | ............. | H04B 1/406 370/229 |
| 8,838,046 B2* | 9/2014 | Fu | ............. | H04B 1/406 455/67.13 |
| 2009/0303975 A1* | 12/2009 | Xhafa | ............. | H04W 72/1215 370/338 |
| 2012/0164948 A1* | 6/2012 | Narasimha | ........ | H04W 72/1215 455/63.1 |
| 2013/0272260 A1* | 10/2013 | Bitran | ............. | H04W 16/14 370/329 |
| 2015/0105122 A1* | 4/2015 | Wei | ............. | H04W 24/04 455/553.1 |

FOREIGN PATENT DOCUMENTS

| WO | 2008124445 A1 | 10/2008 |
|---|---|---|
| WO | 2012156791 A2 | 11/2012 |

\* cited by examiner

*Primary Examiner* — Sai Aung
(74) *Attorney, Agent, or Firm* — McClure, Qualey & Rodack, LLP

(57) ABSTRACT

A wireless module with reduced interference between the multiple wireless antennas therein. A synchronization signal is transmitted from a first transceiver module to a second transceiver module and, accordingly, the second transceiver module operates a transmitter of the second transceiver module at a first operating bandwidth in a time-division mode (with respect to the first transceiver module). The second transceiver module further operates the transmitter of the second transceiver module at a second operating bandwidth in a frequency-division mode (with respect to the first transceiver module).

18 Claims, 5 Drawing Sheets

WIRELESS MODULE AND METHOD OF REDUCING INTERFERENCE BETWEEN MULTIPLE WIRELESS ANTENNAS

BACKGROUND OF THE INVENTION

Field of the Invention

The invention relates to interference reduction between multiple wireless antennas.

Description of the Related Art

Multiple wireless communication technologies are usually used in the same electronic device in today's technology. The different wireless antennas may affect each other. How to reduce interference between the different wireless antennas is an important topic.

BRIEF SUMMARY OF THE INVENTION

A wireless module in an embodiment of the disclosure has a first transceiver module and a second transceiver module. The second transceiver module receives a synchronization signal from the first transceiver module to operate a transmitter of the second transceiver module at a first operating bandwidth in a time-division mode (with respect to the first transceiver module). The second transceiver module further operates the transmitter of the second transceiver module at a second operating bandwidth in a frequency-division mode (with respect to the first transceiver module). In this manner, throughput of the transmitter of the second transceiver module is adaptive to the status of the first transceiver module.

A skirt region of operating channels of the first operating bandwidth for the transmitter of the second transceiver module overlaps adaptive frequency hopping channels of the first transceiver module. The first transceiver module may be a 2.4G Bluetooth transceiver module. The second transceiver module may be a 2.4G WiFi transceiver module, wherein high-throughput 40 is adopted to provide the first operating bandwidth and high-throughput 20 is adopted to provide the second operating bandwidth.

Furthermore, a method for reducing interference between a first wireless antenna and a second wireless antenna is introduced, which includes the following steps: transmitting a synchronization signal from a first transceiver module corresponding to the first wireless antenna to a second transceiver module corresponding to second wireless antenna and thereby the second transceiver module operates a transmitter of the second transceiver module at a first operating bandwidth in a time-division mode (with respect to the first transceiver module); and applying the second transceiver module to operate the transmitter of the second transceiver module at a second operating bandwidth in a frequency-division mode (with respect to the first transceiver module).

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description shows embodiments carrying out the invention. This description is made for the purpose of illustrating the general principles of the invention and should not be taken in a limiting sense. The scope of the invention is best determined by reference to the appended claims.

Figure 1:
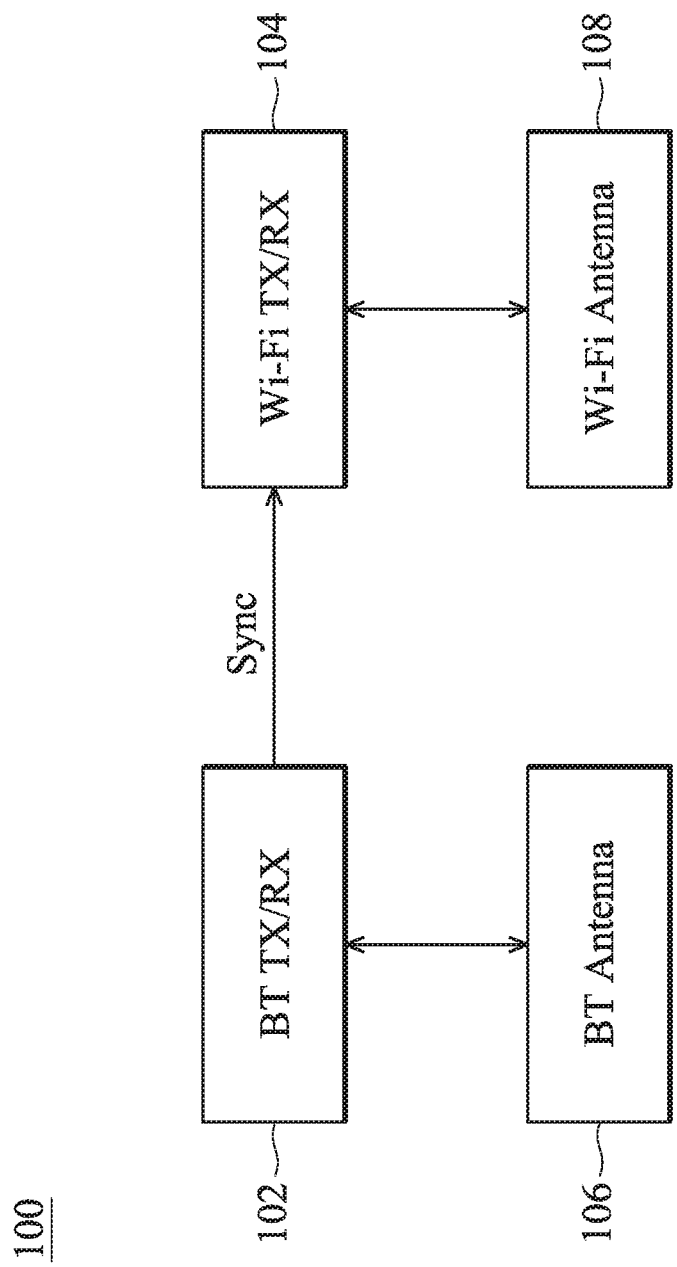
FIG. 1 is a block diagram depicting a wireless module 100 in accordance with an exemplary embodiment of the disclosure.

FIG. 1 is a block diagram depicting a wireless module 100 in accordance with an exemplary embodiment of the disclosure, which includes a Bluetooth transmitter/receiver module (i.e., BT TX/RX) 102, a Wi-Fi transmitter/receiver module (i.e., Wi-Fi TX/RX) 104, a Bluetooth antenna (i.e., BT antenna) 106 and a Wi-Fi antenna 108. The Wi-Fi TX/RX 104 receives a synchronization signal sync from the BT TX/RX 102. According to the synchronization signal sync, the Wi-Fi TX/RX 104 operates a transmitter of the Wi-Fi TX/RX 104 at a first operating bandwidth in a time-division mode with respect to the BT TX/RX 102. Thus, the transmitter of the Wi-Fi TX/RX 104 is allowed to be operated at the first operating bandwidth when the BT TX/RX 102 is not within transmitter-receiver duration and so that the Wi-Fi antenna 108 transmitting Wi-Fi signals at the first operating bandwidth does not affect the wireless communication through the BT antenna 106. The Wi-Fi TX/RX 104 further operates the transmitter of the Wi-Fi TX/RX 104 at a second operating bandwidth in a frequency-division mode with respect to the BT TX/RX 102. Thus, when prohibited from being operated at the first operating bandwidth, the transmitter of the Wi-Fi TX/RX 104 can be operated at the second operating bandwidth without affecting the wireless communication through the BT TX/RX 102. In this manner, the interference between the BT antenna 106 and the Wi-Fi 108 is effectively reduced. The throughput of the transmitter of the Wi-Fi TX/RX 104 is adaptive to the status of the BT TX/RX 102.

In one embodiment, the BT TX/RX 102 and/or the Wi-Fi TX/RX 104 may be replaced by other transceiver modules. Any pair of transceiver modules having the antenna interference problem may use the disclosed technique as a solution. For simplicity, the following discussion using the BT TX/RX 102 as a first transceiver module and the Wi-Fi TX/RX 104 as a second transceiver module.

Figure 2A:
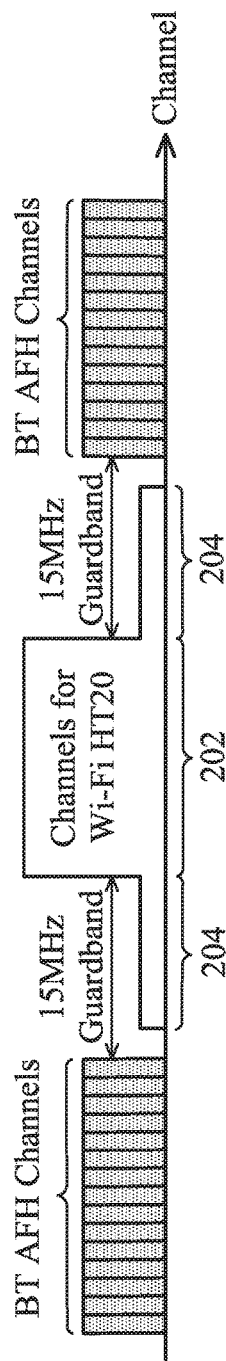
FIG. 2A shows a sufficient guard band (15 MHz) maintained at both ends of the main region 202 of the operating channels of Wi-Fi HT20.
Figure 2B:
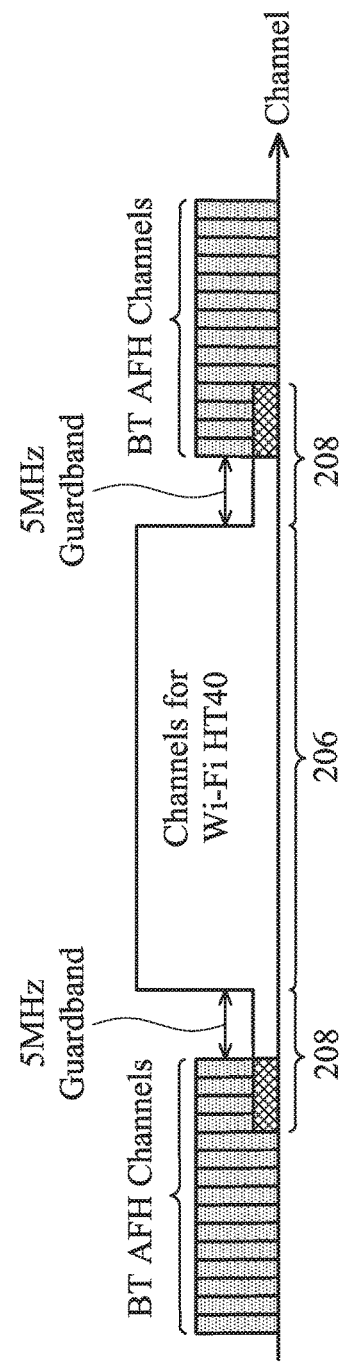
FIG. 2B shows an insufficient guard band, 5 MHz, at both ends of the main region 206 of the operating channels of Wi-Fi HT40.

For example, a skirt region of operating channels of the first operating bandwidth for the transmitter of the Wi-Fi TX/RX 104 overlaps adaptive frequency hopping channels (AFH channels) of the BT TX/RX 102. For example, the BT TX/RX 102 may be a 2.4G BT TX/RX, the Wi-Fi TX/RX 104 may be a 2.4G Wi-Fi TX/RX, high-throughput 40 (a.k.a. Wi-Fi HT40) may be adopted to provide the first operating bandwidth, and high-throughput 20 (a.k.a. Wi-Fi HT20) may be adopted to provide the second operating bandwidth. FIG. 2A shows that a sufficient guard band (15 MHz) is maintained at both ends of the main region 202 of the operating channels of Wi-Fi HT20 without skirt regions 204 of the operating channels of Wi-Fi HT20 overlapping the AFH channels of the BT TX/RX 102. However, as shown in FIG. 2B, the guard band, 5 MHz, is insufficient at both ends of the main region 206 of the operating channels of Wi-Fi HT40 and skirt regions 208 of the operating channels of Wi-Fi HT40 overlap AFH channels of the BT TX/RX 102. When the Wi-Fi antenna 108 transmits Wi-Fi signals at Wi-Fi HT40, the wireless communication through the BT antenna 106 may be affected. Especially when the Wi-Fi antenna 108 is arranged very close to the BT antenna 106 (e.g., the isolation between the Wi-Fi antenna 108 and the BT antenna 106 is less than 30 dB), Wi-Fi signal transmission at Wi-Fi HT40 may damage the wireless communication through the BT antenna 106 seriously. This antenna interference problem is effectively resolved by the disclosure. According to the aforementioned discussion about FIG. 1, the throughput of the transmitter of the Wi-Fi TX/RX 104 is adaptive to the status of the BT TX/RX 102. The transmitter of the Wi-Fi TX/RX 104 is operated at Wi-Fi HT40 in the time-division mode with respect to the BT TX/RX 102 and is operated at Wi-Fi HT20 in the frequency-division mode with respect to the BT TX/RX 102. Furthermore, based on the spectrum shown in FIG. 2A, the Wi-Fi TX/RX 104 may operate a receiver of the Wi-Fi TX/RX 104 at Wi-Fi HT20 in the frequency-division mode with respect to the BT TX/RX 102. Furthermore, in some exemplary embodiments, the receiver of Wi-Fi TX/RX 104 is allowed to be operated at Wi-Fi HT40 no matter whether Wi-Fi HT40 is disabled or enabled for the transmitter of the Wi-Fi TX/RX 104 according to the synchronization signal sync from the BT TX/RX 102.

Figure 3:
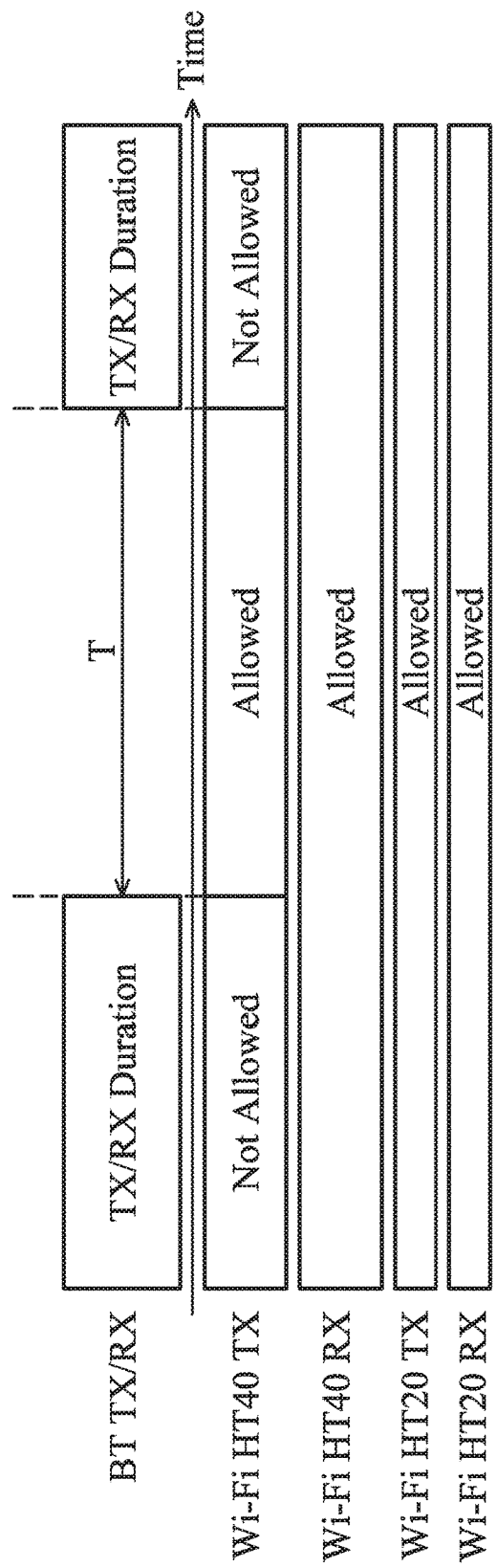
FIG. 3 is a timing diagram about the transmitter-receiver duration of the BT TX/RX 102 and the status of the Wi-Fi HT40 transmitting mode, Wi-Fi HT40 receiving mode, Wi-Fi HT20 transmitting mode and Wi-Fi HT20 receiving mode in accordance with an exemplary embodiment of the disclosure.

FIG. 3 is a timing diagram about the transmitter-receiver duration of the BT TX/RX 102 and the status of the Wi-Fi HT40 transmitting mode, Wi-Fi HT40 receiving mode, Wi-Fi HT20 transmitting mode and Wi-Fi HT20 receiving mode in accordance with an embodiment of the disclosure. The transmitter of the Wi-Fi TX/RX 104 is allowed to be operated at Wi-Fi HT40 when the BT TX/RX 102 is within a time interval T (not within the transmitter-receiver duration). The transmitter of the Wi-Fi TX/RX 104 is prohibited from being operated at Wi-Fi HT40 when the BT TX/RX 102 is within the transmitter-receiver duration. The receiver of the Wi-Fi TX/RX 104 is allowed to be operated at Wi-Fi HT40 no matter whether Wi-Fi HT40 is disabled or enabled for the transmitter of the Wi-Fi TX/RX 104 according to the synchronization signal sync from the BT TX/RX 102. As for Wi-Fi HT20, the transmitting mode and the receiving mode are allowed no matter whether the BT TX/RX 102 is or is not within the transmitter-receiver duration.

In one embodiment, the BT TX/RX 102 predicts when to restart the transmitter-receiver duration and outputs the synchronization signal sync to the Wi-Fi TX/RX 104 to show the remaining time before the restarted transmitter-receiver duration. The synchronization signal sync showing the remaining time may be 32-bits. The transmitter of the Wi-Fi TX/RX 104 is operated at Wi-Fi HT40 when the remaining time is sufficient, and is operated at Wi-Fi HT20 when the remaining time is insufficient.

Figure 4:
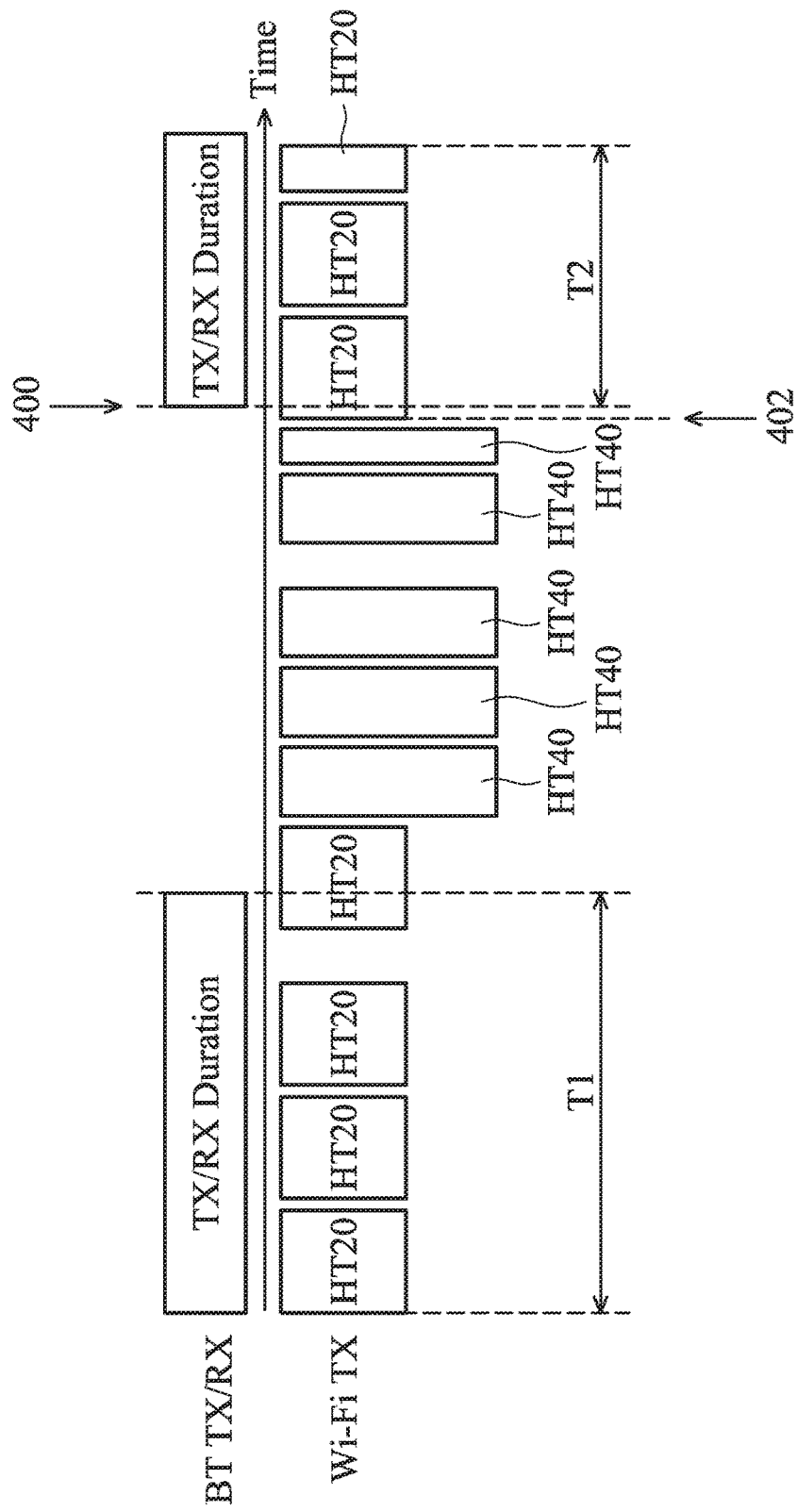
FIG. 4 is a timing diagram depicting the transmitter-receiver duration of the BT TX/RX 102 and the status of the transmitter of the Wi-Fi TX/RX 104.

FIG. 4 is a timing diagram depicting the transmitter-receiver duration of the BT TX/RX 102 and the status of the transmitter of the Wi-Fi TX/RX 104. In time interval T1, the BT TX/RX 102 still within the transmitter-receiver duration is not triggered to predict when to restart the transmitter-receiver duration and the synchronization signal sync shows that the remaining time is zero or under a predetermined threshold. Thus, the transmitter of the Wi-Fi TX/RX 104 is operated at Wi-Fi HT20 during the time interval T1. After the time interval T1, the BT TX/RX 102 predicts the restart time 400 of transmitter-receiver duration and outputs non-zero remaining time before the restarted transmitter-receiver duration as the synchronization signal sync. When it is determined that the non-zero remaining time is sufficient for the requested Wi-Fi HT40 transmission, the transmitter of the Wi-Fi TX/RX 104 is operated at Wi-Fi HT40. At time 402, the non-zero remaining time before time 400 is insufficient for the requested Wi-Fi HT40 transmission and the transmitter of the Wi-Fi TX/RX 104 is switched back to Wi-Fi HT20. Later, during the time interval T2, the remaining time is zero and the transmitter of the Wi-Fi TX/RX 104 is operated at Wi-Fi HT20.

In one embodiment, the Wi-Fi TX/RX 104 requests the synchronization signal sync every time the transmitter of the Wi-Fi TX/RX 104 is operated to transmit signals. In another embodiment, the BT TX/RX 102 actively outputs the synchronization signal sync. For example, the BT TX/RX 102 may output the synchronization signal regularly, e.g. periodically.

Figure 5:
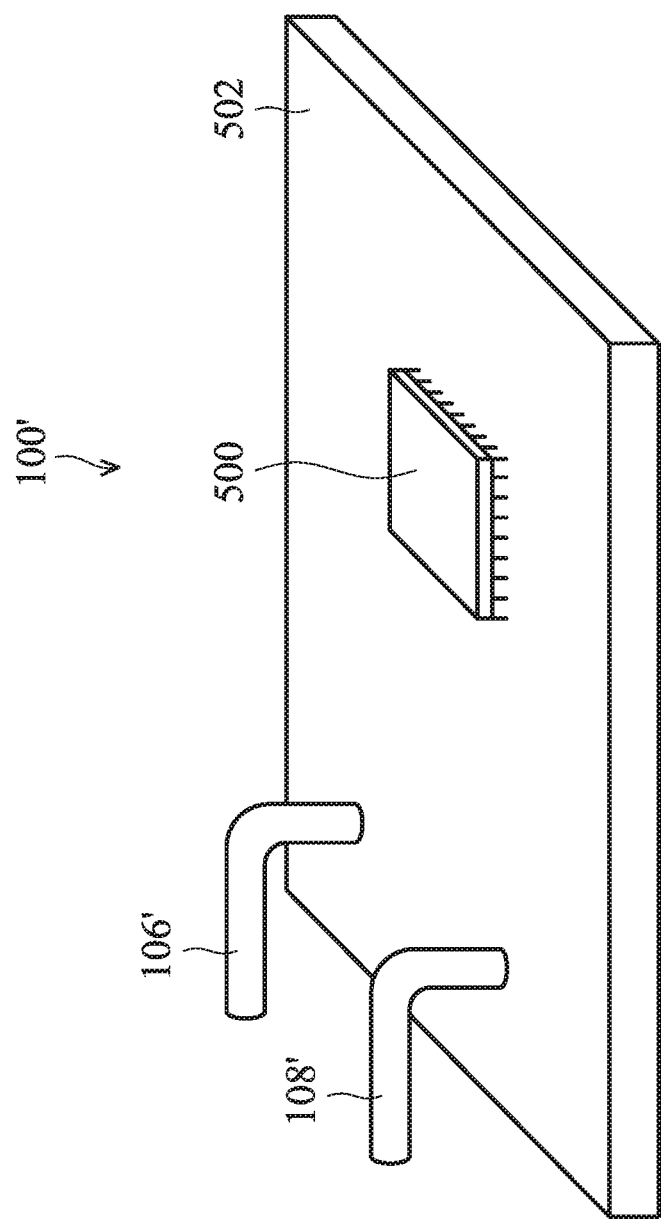
FIG. 5 depicts a wireless module 100' in accordance with an exemplary embodiment of the disclosure.

The BT TX/RX 102 and the Wi-Fi TX/RX 104 may be separate chips or be integrated as a combo chip. FIG. 5 depicts a wireless module 100' in accordance with an embodiment of the disclosure. A combo chip 500 comprising the disclosed BT TX/RX (102) and Wi-Fi TX/RX (104) is mounted on the PCB 502 with a BT antenna 106' and a Wi-Fi antenna 108'. The antenna interference problem due to the closely manufactured BT antenna 106' and Wi-Fi antenna 108' is effectively reduced by the combo chip 500 of the disclosure.

Note that the 2.4G BT TX/RX and the 2.4G Wi-Fi TX/RX and the operating bandwidth Wi-Fi HT20/Wi-Fi HT40 are not intended to limit the invention and may be changed according to the user's needs.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless device, comprising:
a first transceiver; and
a second transceiver, receiving a synchronization signal from the first transceiver to operate a transmitter of the second transceiver at a first operating bandwidth in a time-division mode,
wherein:
the second transceiver operates the transmitter of the second transceiver at a second operating bandwidth in a frequency-division mode;
the first transceiver predicts when to restart transmitter-receiver duration of the first transceiver and outputs the synchronization signal to the second transceiver to indicate a remaining time before the restarted transmitter-receiver duration; and the transmitter of the second transceiver is operated at the first operating bandwidth when the remaining time is sufficient.

2. The wireless device as claimed in claim 1, wherein:
a skirt region of operating channels of the first operating bandwidth for the transmitter of the second transceiver overlaps adaptive frequency hopping channels of the first transceiver.

3. The wireless device as claimed in claim 1 wherein:
the second transceiver further operates a receiver of the second transceiver at the second operating bandwidth in the frequency-division mode.

4. The wireless device as claimed in claim 1 wherein:
a receiver of the second transceiver is allowed to be operated at the first operating bandwidth no matter whether the first bandwidth for the transmitter of the second transceiver is disabled or enabled according to the synchronization signal from the first transceiver.

5. The wireless device as claimed in claim 1, wherein:
the transmitter of the second transceiver is operated at the second operating bandwidth when the remaining time is insufficient.

6. The wireless device as claimed in claim 1, wherein:
the second transceiver requests the synchronization signal every time the transmitter of the second transceiver is operated to transmit signals.

7. The wireless device as claimed in claim 1, wherein:
the first transceiver outputs the synchronization signal regularly.

8. The wireless device as claimed in claim 1, wherein:
the first transceiver is a 2.4G Bluetooth transceiver; and
the second transceiver is a 2.4G WiFi transceiver, and high-throughput 40 is adopted to provide the first operating bandwidth and high-throughput 20 is adopted to provide the second operating bandwidth.

9. The wireless device as claimed in claim 1, wherein:
the first transceiver and the second transceiver are separate chips or integrated as a combo chip.

10. A method for reducing interference between a first wireless antenna and a second wireless antenna, comprising:
transmitting a synchronization signal from a first transceiver corresponding to the first wireless antenna to a second transceiver corresponding to the second wireless antenna and thereby the second transceiver operates a transmitter of the second transceiver at a first operating bandwidth in a time-division mode;

applying the second transceiver to operate the transmitter of the second transceiver at a second operating bandwidth in a frequency-division mode;

applying the first transceiver to predict when to restart transmitter-receiver duration of the first transceiver and thereby the first transceiver outputs the synchronization signal to the second transceiver to indicate a remaining time before the restarted transmitter-receiver duration, wherein the transmitter of the second transceiver is operated at the first operating bandwidth when the remaining time is sufficient.

11. The method as claimed in claim 10, wherein:
a skirt region of operating channels of the first operating bandwidth for the transmitter of the second transceiver overlaps adaptive frequency hopping channels of the first transceiver.

12. The method as claimed in claim 10, further comprising:
applying the second transceiver to operate a receiver of the second transceiver at the second operating bandwidth in the frequency-division mode.

13. The method as claimed in claim 10, wherein:
a receiver of the second transceiver is allowed to be operated at the first operating bandwidth no matter whether the first bandwidth for the transmitter of the second transceiver is disabled or enabled according to the synchronization signal from the first transceiver.

14. The method as claimed in claim 10, wherein:
the transmitter of the second transceiver is operated at the second operating bandwidth when the remaining time is insufficient.

15. The method as claimed in claim 10, wherein:
the second transceiver requests the synchronization signal every time the transmitter of the second transceiver is operated to transmit signals.

16. The method as claimed in claim 10, wherein:
the first transceiver outputs the synchronization signal regularly.

17. The method as claimed in claim 10, wherein:
the first transceiver is a 2.4G Bluetooth transceiver; and
the second transceiver is a 2.4G WiFi transceiver, and high-throughput 40 is adopted to provide the first operating bandwidth and high-throughput 20 is adopted to provide the second operating bandwidth.

18. The method as claimed in claim 10, wherein:
the first transceiver and the second transceiver are separate chips or integrated as a combo chip.

* * * * *